(12) United States Patent
Kato (10) Patent No.: US 6,357,402 B1
(45) Date of Patent: Mar. 19, 2002

(54) DIRECT INJECTED ENGINE FOR OUTBOARD MOTOR

(75) Inventor: Masahiko Kato, Iwata (JP)

(73) Assignee: Sanshin Kogyo Kabushiki Kaisha, Hamamatsu (JP)

( * ) Notice: Subject to any disclaimer, the term of this patent is extended or adjusted under 35 U.S.C. 154(b) by 0 days.

(21) Appl. No.: 09/286,786

(22) Filed: Apr. 6, 1999

Related U.S. Application Data (63) Continuation-in-part of application No. 09/131,480, filed on Aug. 10, 1998, now Pat. No. 6,032,638.

(30) Foreign Application Priority Data

Apr. 6, 1998 (JP) ............................................ 10-093065

(51) Int. Cl.$^7$ ................................................ F02B 33/04
(52) U.S. Cl. ................................ 123/73 C; 123/73 CA; 123/65 P
(58) Field of Search .......................... 123/73 C, 73 CA, 123/65 P, 666, 193.6

(56) References Cited

U.S. PATENT DOCUMENTS

| | | | | |
|---|---|---|---|---|
| 4,324,214 A | * | 4/1982 | Garcea ........................ 123/666 |
| 4,445,468 A | * | 5/1984 | Onishi et al. .............. 123/73 B |
| 4,920,932 A | * | 5/1990 | Schlunke ................... 123/73 C |
| 5,020,485 A | * | 6/1991 | Watanabe .................. 123/73 C |
| 5,134,984 A | * | 8/1992 | Nonaka et al. ........... 123/73 C |
| 5,553,579 A | * | 9/1996 | Yoshida et al. ........... 123/73 C |
| 5,671,703 A | * | 9/1997 | Otome et al. .............. 123/65 P |
| 6,032,638 A | * | 3/2000 | Kato ........................ 123/73 C |
| 6,058,907 A | * | 5/2000 | Motose et al. ............ 123/73 C |

* cited by examiner

Primary Examiner—Marguerite McMahon
Assistant Examiner—Jason Benton
(74) Attorney, Agent, or Firm—Ernest A. Beutler (57) ABSTRACT

Several embodiments of combustion chamber configurations for direct injected engines having a substantial recess in the cylinder head in which the fuel injector is positioned and injects. The injector is arranged so as to be disposed over the exhaust port and to spray toward the auxiliary scavenge port. However, the spray pattern is such that fuel will not impinge upon the cylinder head surface and so that the scavenge flow will direct the fuel away from the cylinder walls and toward the head of the piston for cooling and better vaporization. This also ensures that fuel will not pass out of the exhaust port.

21 Claims, 10 Drawing Sheets

DIRECT INJECTED ENGINE FOR OUTBOARD MOTOR

CROSS REFERENCE TO RELATED APPLICATION

This application is a continuation in part of my co-pending application, application Ser. No: 09/131480, filed Aug. 10, 1998, now issued as U.S. Letters Patents 6032638 on Mar. 7, 2000 and assigned to the assignee hereof.

BACKGROUND OF THE INVENTION

This invention relates to a direct injected engine for an outboard motor and more particularly to an improved direct injection system for a two cycle internal combustion engine.

Two cycle engines are widely used, particularly in applications where high specific outputs and relatively uncomplicated, simple engine constructions are desirable. Thus, two cycle engine are frequently employed as the power plant in an outboard motor because of the small space available in the powerhead of such engines and the demand for relatively high performance.

However, because of environmental concerns, there is a desire to significantly improve the performance of two cycle engines particularly in the area of exhaust emission control. One particularly advantageous method for reducing unburned hydrocarbons in the exhaust system without sacrificing engine performance is through the use of direct cylinder injection. However, because of the fact that the engine fires every revolution of the crankshaft, and because of the overlap between the scavenging and the exhaust portions of the cycle, there is a danger that the fuel will pass out of the exhaust port.

Also, the injection rates basically must be somewhat higher with two cycle engines and four cycle engines because of the fact that there is generally less time during which the fuel can be injected. This makes it more difficult to insure that all of the injected fuel will be sufficiently vaporized to burn completely.

With two cycle engines, it is also desirable to provide some method for cooling the head of the piston. In normal crankcase compression type engines where fuel is introduced through the crankcase chamber, the fuel on the underside of the piston head can function to cool it. However, this cooling is not available with direct injected engine.

It is, therefore, a principal object of this invention to provide an improved combustion chamber configuration for a direct injected two cycle engine.

It is a further object of this invention to provide a combustion chamber arrangement for a two cycle engine wherein the fuel injector will spray in a manner to afford good fuel vaporization and still avoid fuel from passing out of the exhaust port.

It is a further object of this invention to provide an combustion chamber configuration and fuel injection system for a two cycle engine wherein the injector sprays in a manner so as to deposit some fuel on the head of the piston so as to assist in cooling of the piston.

It is a further object of this invention to provide an improved combustion chamber configuration for a direct injected two cycle engine wherein the fuel injector is mounted in the cylinder head and in such a manner as to ensure that fuel will not impinge upon areas of the cylinder head or on the spark plug.

SUMMARY OF THE INVENTION

This invention is adapted to be embodied in a two cycle internal combustion engine operating on a crankcase compression principal. The engine has a combustion chamber that is defined by a cylinder bore of a cylinder block, a piston reciprocating in that cylinder bore and a cylinder head closing the cylinder bore and having a recessed area cooperating with the piston and cylinder bore to form the combustion chamber of the engine. At least one scavenge port opens into one side of the cylinder bore and is opened and closed by the reciprocation of the piston therein. At least one exhaust port is also formed in the cylinder bore and is opened and closed by the reciprocation of the piston. The at least one scavenge port and at least one exhaust port are disposed in diametrically opposed relationship. A fuel injector is mounted in the cylinder head and has its injection tip extending into the cylinder head recess for spraying fuel into the combustion chamber. The fuel injector is positioned generally on the side of the combustion chamber where the exhaust port is located. The fuel injector sprays generally downwardly and toward the at least one scavenge port and has a spray pattern that is configured so that it will not impinge upon the cylinder head recessed surface area.

DETAILED DESCRIPTION OF THE PREFERRED EMBODIMENTS OF THE INVENTION

The general overall environment in which the invention is practiced and certain details of the engine will be described, initially primarily by reference to FIGS. 1 through 7.

Figure 1:
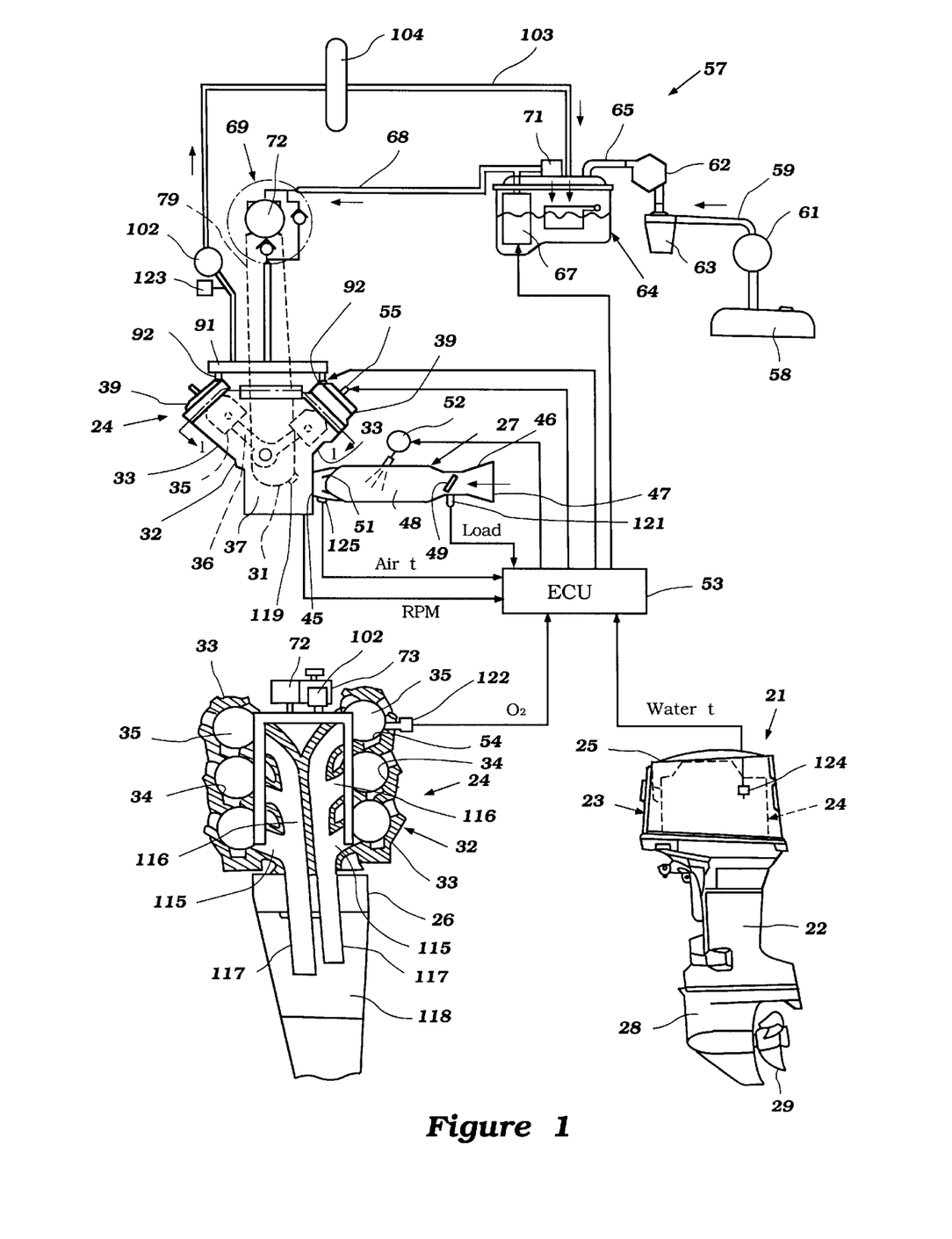
FIG. 1 is a multi-part view showing: (1) in the lower right-hand portion, an outboard motor embodying the invention; (2) in the upper view, a partially schematic view of the engine of the outboard motor with its induction and fuel injection system shown in part schematically; and (3) in the lower left-hand portion, a rear elevational view of the outboard motor with portions removed and other portions broken away and shown in section along the line 1—1 in the upper view so as to more clearly show the construction of the engine. An ECU (Electric Control Unit) for the motor links the three views together.

In the lower-right hand view of the FIG. 1, an outboard motor constructed and operated in accordance with an embodiment of the invention is depicted in side elevational view and is identified generally by the reference numeral 21. The entire outboard motor 21 is not depicted in that the swivel bracket and clamping bracket that are associated with the driveshaft housing, indicated generally by the reference numeral 22, are not illustrated. This is because these components are well known in the art and the specific method by which the outboard motor 21 is mounted to the transom of an associated watercraft is not necessary to permit those skilled in the art to understand or practice the invention.

The outboard motor 21 includes a power head, indicated generally by the reference numeral 23, that is positioned above the driveshaft housing 22 and which includes a powering internal combustion engine, indicated generally by the reference numeral 24. This engine 24 is shown in more detail in the remaining two view of this figure and will be described shortly by reference thereto.

The power head 23 is completed by a protective cowling which includes a main cowling member 25. This main cowling member 25 is detachably connected to a lower tray portion of the protective cowling around an exhaust guide 26 which is and encircles an upper portion of the driveshaft housing 22. The main cowling member 25 has a suitable air inlet arrangement so that air is introduced into the interior of the main cowling member 25 and then goes to an engine air induction system, indicated generally by the reference numeral 27, which will be described later in detail.

Positioned beneath the driveshaft housing 22 is a lower unit 28 in which a propeller 29, which forms the propulsion device for the associated watercraft, is journaled.

As is typical with outboard motor practice, the engine 24 is supported in the power head 23 so that its crankshaft 31 (see the upper view) rotates about a vertically extending axis. This is done so as to facilitate connection of the connection of the crankshaft 31 to a driveshaft (not shown) which depends into the driveshaft housing 22 and which drives the propeller 29 through a conventional forward, neutral, reverse transmission contained in the lower unit 28.

The details of the construction of the outboard motor and the components which are not illustrated may by considered to be conventional or of any type known to those wishing to utilize the invention disclosed herein. Those skilled in the art can readily refer to any known constructions with which to practice the invention.

Referring now in detail to the construction of the engine 24 still by primary reference to FIG. 1, in the illustrated embodiment, the engine 24 is of the V6 type and operates on a two stroke, crankcase compression principle. Although the invention is described in conjunction with an engine having this cylinder number and cylinder configuration, it will be readily apparent that the invention can be utilized with engines having other cylinder numbers and other cylinder configurations. Some features of the invention, however, have particular utility in connection with V-type engines.

Also, although the engine 24 will be described as operating on a two stroke principle, it will also be apparent to those skilled in the art that certain facets of the invention can be employed in conjunction with four stroke engines even though they have primary utility with two cycle engines. In fact, some features of the invention also can be employed with rotary type engines.

The engine 24 is comprised of a cylinder block 32 that is formed with a pair of cylinder banks 33. Each of these cylinder banks 33 is formed with three vertically spaced, horizontally extending cylinder bores 34. Pistons 35 reciprocate in these cylinder bores 34. The pistons 35 are, in turn, connected to the upper or small ends of connecting rods 36. The big ends of these connecting rods are journaled on the throws of the crankshaft 31 in a manner that is well known in this art.

The crankshaft 31 is journaled in a suitable manner for rotation within a crankcase chamber 37 that is formed in part by a crankcase member 38 that is affixed to the cylinder block 32 in a suitable manner. As is typical with two stroke engines, the crankshaft 31 and crankcase chamber 37 are formed with seals so that each section of the crankcase that is associated with one of the cylinder bores 34 will be sealed from the others. This type of construction is well known in the art.

A cylinder head assembly, indicated generally by the reference numeral 39, is affixed to the end of the cylinder banks 33 that are spaced from the crankcase chamber 37. These cylinder head assemblies 39 are comprised of a main cylinder head member 41 that defines a plurality of recesses in its lower face. These recesses appear in FIGS. 6 through 9 and are designated by the reference numeral 42. Each of these recesses 42 corporate with the respective cylinder bore 34 and the head of the piston 35 to define the combustion chambers 43 of the engine.

A cylinder head cover member 44 completes the cylinder head assembly 39. The cylinder head members 41 and 32 are affixed to each other and to the respective cylinder banks 33 in a suitable, known manner.

The air induction system 27 is provided for delivering an air charge to the sections of the crankcase chamber 37 associated with each of the cylinder bores 34. This communication is via an intake port 45 formed in the crankcase member 38 and registering with each such crankcase chamber section.

The induction system 27 includes an air silencing and inlet device, shown schematically in this figure (FIG. 1) and indicated by the reference numeral 46. The actual construction of this air charge device appears in FIGS. 2 and 4. In actual physical location, this device 46 is contained within the cowling member 25 at the forward end thereof and has a rearwardly facing air inlet opening 47 through which air is introduced.

The air inlet device 46 supplies the induced air to a plurality of throttle bodies or induction devices 48, each of which has a throttle valve 49 provided therein. These throttle valves 49 are supported on throttle valve shafts (not shown). These throttle valve shafts are linked to each other for simultaneous opening and closing of the throttle valves 49 in a manner that is well known in this art.

As is also typical in two cycle engine practice, the intake ports 45 have, provided in them, reed-type check valves 51. These check valves 51 permit the air to flow into the sections of the crankcase chamber 37 when the pistons 35 are moving upwardly in their respective cylinder bores. However, as the pistons 35 move downwardly, the charge will be compressed in the sections of the crankcase chamber 37. At that time, the reed type check valve 51 will close so as to permit the charge to be compressed.

In addition, lubricant pumps 52 are provided for spraying lubricant into the throttle bodies 48 for engine lubrication under the control of an ECU (Electronic Control Unit) 53 that will be described more in detail later. Although it is not shown, some forms of direct lubrication may be also employed for delivering lubricant directly to certain components of the engine.

The charge which is compressed in the sections of the crankcase chamber 37 is then transferred to the combustion chambers as through a scavenging system that terminate in scavenging ports 54 in a manner that is well known.

A spark plug 55 is mounted in the cylinder head assembly 39 for each cylinder bore. The spark plugs 55 are fired under the control of the ECU 53.

The spark plug 55 fire a fuel air charge that is formed by mixing fuel directly with the intake air in the combustion chambers 43 via a respective fuel injector 56. The fuel injectors 56 are solenoid type and electrically operated also under the control of the ECU 53. The fuel injectors 56 are mounted directly in the cylinder head 41 in a specific location, as will be described, so as to provide optimum fuel vaporization or diffusion under all running conditions.

Fuel is supplied to the fuel injectors 56 by a fuel supply system, indicated generally by the reference numeral 57 (see the upper and lower left hand views of FIG. 1). The fuel supply system 57 composes a main fuel supply tank 58 that is provided in the hull of the watercraft with which the outboard motor 21 is associated.

Fuel is drawn from this tank 58 through a conduit 59 by means of a first low pressure pump 61 and a plurality of second low pressure pumps 62. The first low pressure pump 61 is a manually operated pump and the second low pressure pumps 62 are diaphragm type pumps operated by variations in pressure in the sections of the crankcase chamber 37, and thus provide a relatively low pressure.

A quick disconnect coupling (not shown) is provided in the conduit 59 and also a fuel filter 63 is positioned in the conduit 59 at an appropriate location within the main cowling member 25 for ease of servicing.

From the low pressure pump 62, fuel is supplied to a vapor separator 64 which is mounted on the engine 24 or within the cowling member 25 at an appropriate location. This fuel is supplied through a line 65. At the vapor separator end of the line 65, there is provided at a float valve (not shown) that is operated by a float 66 so as to maintain a uniform level of fuel in the vapor separator 64.

A high pressure electric fuel pump 67 is provided in the vapor separator 64 and pressurizes fuel that is delivered through a fuel supply line 68 to a high pressure pumping apparatus, indicated generally by the reference numeral 69. The electric fuel pump 67, which is driven by an electric motor, develops a pressure such as 3 to 10 kg/cm$^2$. A low pressure regulator 71 is positioned in the line 68 at the vapor separator 64 and limits the pressure that is delivered to the high pressure pumping apparatus 69 by dumping the fuel back to the vapor separator 64.

The high pressure fuel delivery system 69 includes a high pressure fuel pump 72 that can develop a pressure of, for example, 50 to 100 kg/cm$^2$ or more. A pump drive unit 73 (the lower left hand view) is provided for driving the high pressure fuel pump 72.

Referring to FIGS. 2–6, the pump drive unit 73 is partly affixed to the cylinder block 32 via a mounting plate 74 with bolts 75 and partly directly affixed to the cylinder block 32 so as to overhang between the two banks 33 of the V arrangement.

A pulley 76 is affixed to a pump drive shaft 77 of the pump drive unit 73. The pulley 76 is driven from a driving pulley 78 affixed to the crankshaft 31 by means of a drive belt 79.

The pump drive shaft 77 is provided with a cam disc 81 for pushing pumping plungers 82 which are disposed on the high pressure fuel pump 72.

The high pressure fuel pump 72 is mounted on the pump drive unit 73 with bolts 83.

Figure 5:
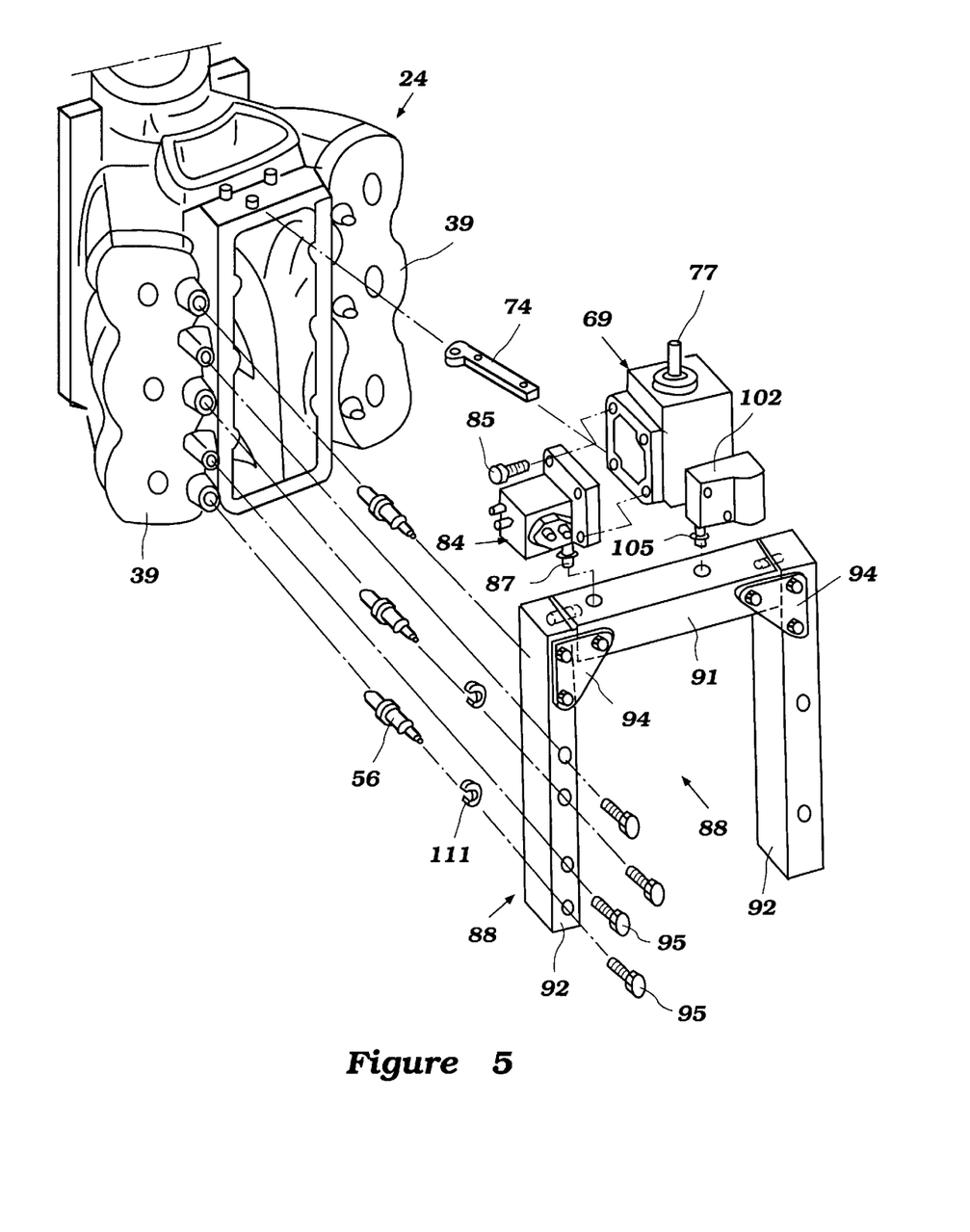
FIG. 5 is an exploded perspective view showing how the elements of the fuel injection system are connected to each other and to the remainder of the engine body.

The high pressure fuel pump 72 has a unified fuel inlet and outlet module 84 which is mounted on a side wall of the pressure pump 72 by mounting bolts 85. The inlet and outlet module 84 has an inlet passage 86 connected with the line 68 (FIG. 1), an outlet passage 87 connected with a fuel injector supply system indicated generally at 88 and an overflow passage 89 connected with the vapor separator 64 (FIG. 1). The line for returning the overflow fuel to the vapor separator 64 is omitted in FIG. 1.

Fuel is supplied from the high pressure fuel pump 72 to the fuel injector supply system 88. The fuel injector supply system 88 is comprised of a main fuel manifold 91 that extends horizontally. The main fuel manifold 91, in turn, delivers fuel to a pair of vertically extending fuel rails 92. The fuel rails 92 deliver fuel to the fuel injectors 56.

The fuel rails 92 are affixed to the main manifold 91 with bolts 93 and attachment plates 94. Also, the respective fuel rails 92 are affixed to both of the cylinder heads 41 with bolts 95. Thus, the fuel supply conduit 88 is mounted on the engine 24 by means of the pump drive unit 73 via the stay 74, partly directly, at the cylinder body 32 and by means of fuel rails 92 at the cylinder head 41.

The main manifold 91 and the fuel rails 92 are formed with drillings therein to form fuel passages 96 and 97. The fuel passage 96 in the main manifold 91 and the fuel passages 97 in both of the fuel rails are connected to each other in a manner to be described.

The outlet passage 87 of the fuel inlet and outlet module 84 is connected to the fuel passage 96 of the main manifold 91 with a connector 97 around which is sealed with O-shaped elastic (rubber) rings 98. The main manifold 91 and the fuel rails 92, in turn, are connected together with connectors 99 around which are also sealed with the O-shaped elastic rings 101 also.

The pressure of the fuel supplied by the fuel pump 72 to the fuel injectors 56 is regulated to be the fixed value by a high pressure regulator 102 (See also FIG. 1) which dumps fuel back to the vapor separator 64 through a pressure relief line 103 in which a fuel heat exchanger or cooler 104 is provided. It is important to keep the fuel under the constant pressure. Because the fuel amounts are determined by changes of duration of injection under the condition that the pressure for injection is always the same.

The pressure regulator 102 is also mounted on the pump drive unit 73 with bolts (not shown). The pressure regulator 102 has a passage 104 therein that forms a part of the pressure relief line 103 (FIG. 1) and this passage 104 is connected to the fuel passage 96 in the main manifold 91 with a connector 105 around which is also sealed with an O-shaped elastic ring 106. The fuel injectors 56 are affixed between the fuel rails 92 and the cylinder head assemblies 41 with bolts 107. In addition the connection of the fuel rails 92 to the cylinder head assemblies 41 assists in this connection.

Figure 6:
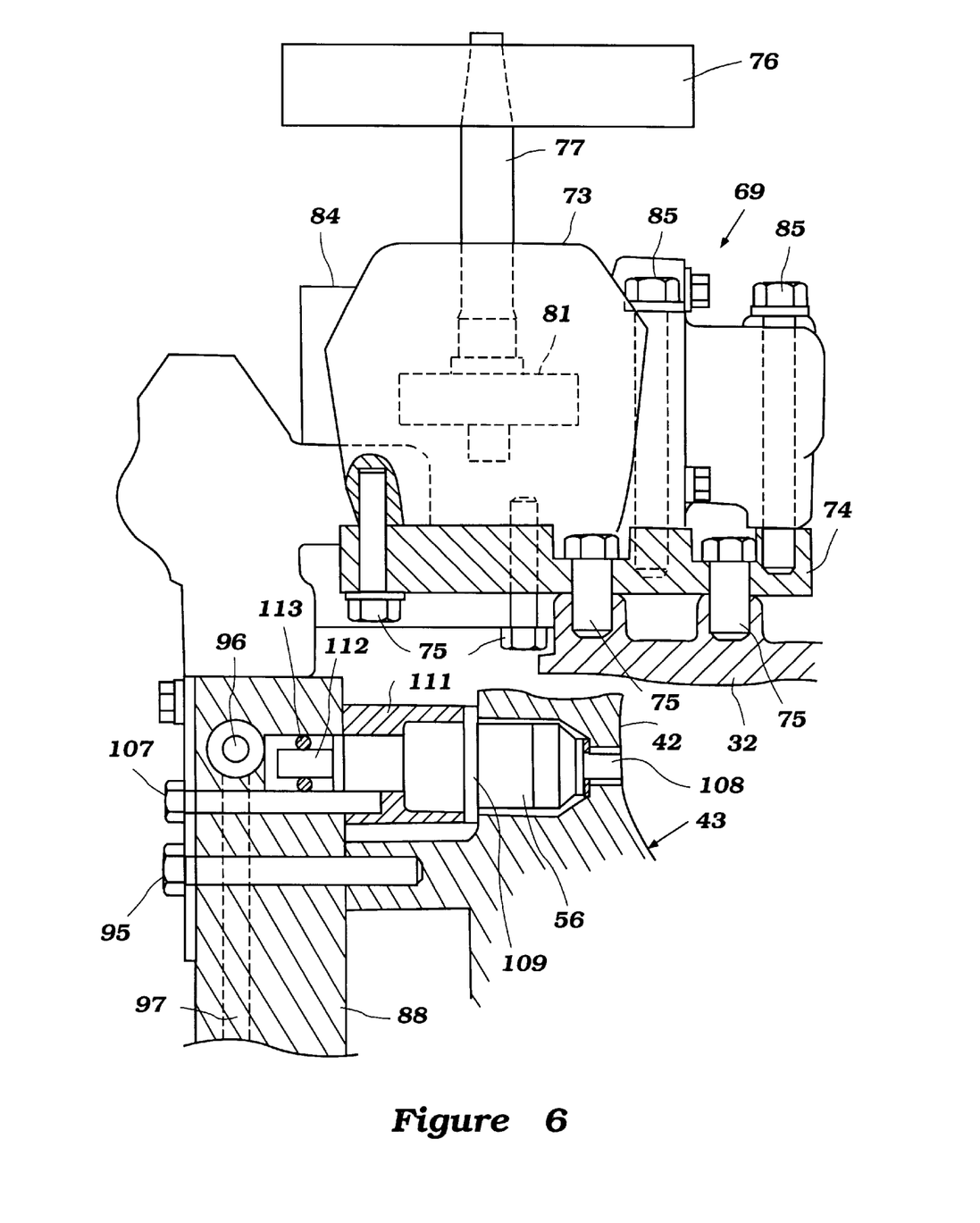
FIG. 6 is an enlarged view looking in the same general direction as FIG. 4 but has portions of the engine broken away so as to show the method of attachment of the fuel rail to the fuel injectors.
Figure 7:
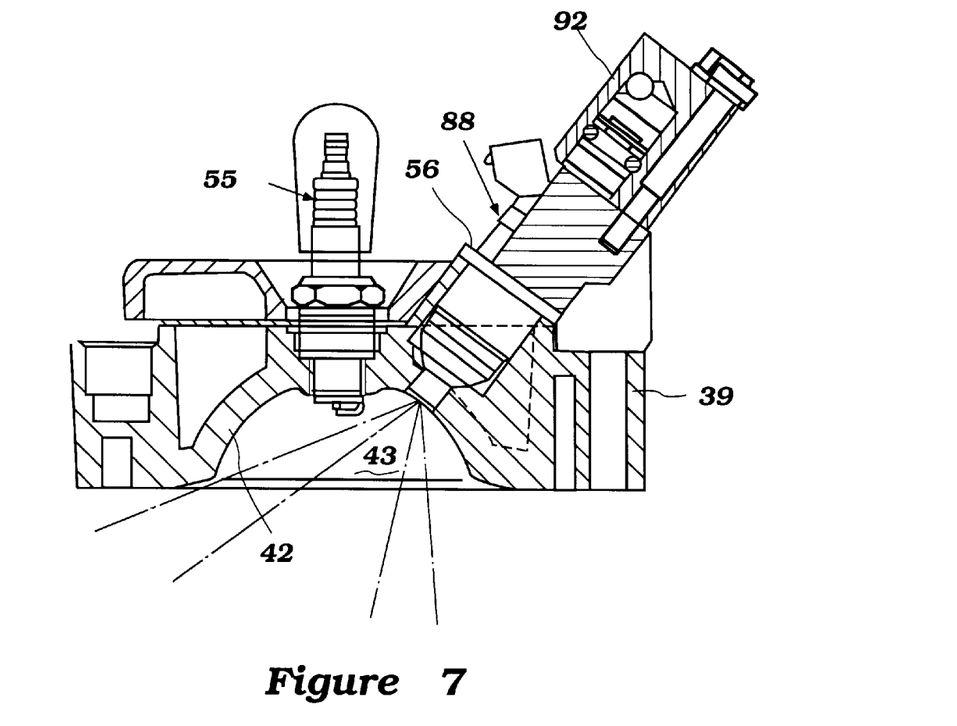
FIG. 7 is a cross-sectional view taken through one of the combustion chambers and shows the fuel injection spray pattern relative to the cylinder head.
Figure 8:
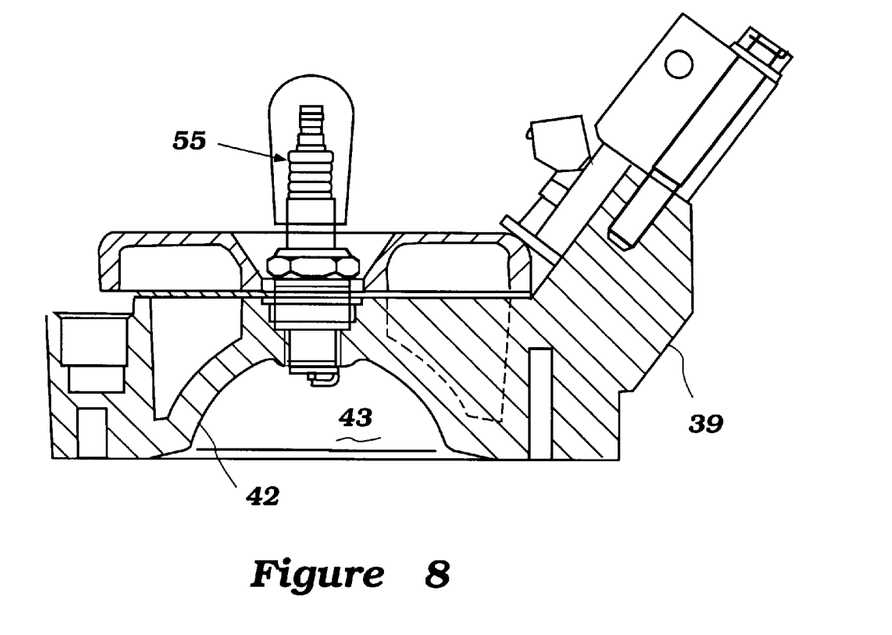
FIG. 8 is a cross-sectional view taken along another plane passing through the combustion chamber but shows additionally the mounting arrangement for the fuel rail.

The mounting for the fuel injectors 56 is shown best in FIGS. 5 and 6. It will be seen that each fuel injector 56 is formed with a nozzle tip 108 that has a construction which will be described in more detail later by reference to FIG. 10 and from which fuel is injected into the combustion chambers 43.

A body portion of the fuel injector 56 is formed with a protrusion 109 that is engaged by a supporting sleeve 111 to which the fasteners 107 are connected. A fuel receiving tip 112 of the injector 56 is received in a bore in the respective fuel rail 92 and an O-ring seal 113 encircles it so as ensure that there will be no fuel leakage in this area.

As noted, the injector tip 108 injects into the combustion chamber 43 and the relationship of this spray pattern will be described shortly by reference to FIGS. 7–11.

Returning back to FIG. 1, after the fuel charge has been formed in the combustion chambers by the injection of fuel from the fuel injectors 56, the charge is fired by firing the spark plugs 55. The injection timing and duration, as well as the control for the timing of firing of the spark plugs 55, are controlled by the ECU 53 in a manner which will be described shortly.

Once the charge burns and expands, the pistons 35 will be driven downwardly in the cylinder bores until the pistons 35 reach the lowermost position. At this time, an exhaust port 114 will be uncovered so as to open the communication with an exhaust passage 115 (see the lower left-hand view) formed in the cylinder block 32. The exhaust gases flow through the exhaust passages 115 to manifold collector sections 116 of respective exhaust manifolds that are formed within the cylinder block 32. These exhaust manifold collector sections 116 communicate with exhaust passages formed in the exhaust guide plate 26 on which the engine 24 is mounted.

A pair of exhaust pipes 117 depends from the exhaust guide plate 26 and extend the exhaust passages 115 into an expansion chamber 118 formed in the driveshaft housing 22. From this expansion chamber 118, the exhaust gases are discharged to the atmosphere through a suitable exhaust system. As is well known in outboard motor practice, this may include an underwater, high speed exhaust gas discharge and an above the water, low speed exhaust gas discharge. Since these types of systems are well known in the art, a further description of them is not believed to be necessary to permit those skilled in the art to practice the invention.

A feedback control system performed by the ECU 53 is provided for realizing a control strategy by which the beginning and duration of fuel injection from the injectors 56 and timing of firing of the spark plugs 55 are controlled. This may be of any known or desired type.

The feedback control system comprises the ECU 53 as a control unit or device and a number of sensors which sense either engine running conditions, ambient conditions or conditions of the outboard motor 21 that will effect engine performance. Certain of the sensors are shown schematically in FIG. 1 and will be described by reference to that figure. It should be readily apparent to those skilled in the art, however, that other types of sensing and control arrangements may be provided.

There is provided, associated with the crankshaft 31, a crankshaft angle position sensor 119 which, when measuring crankshaft angle versus time, outputs a crankshaft rotational speed signal or engine speed signal to the ECU 53.

Operator demand or engine load, as determined by throttle angle of the throttle valve 49, is sensed by a throttle position sensor 121 which outputs a throttle position or load signal to the ECU 53.

A combustion condition or oxygen ($O_2$) sensor 122 is provided that senses the in cylinder combustion conditions by sensing the residual amount of oxygen in the combustion products at a time near the time when the exhaust port is opened. This output and air fuel ratio signal transmitted to the ECU 53.

There is also provided a pressure sensor 123 in line connected to the pressure regulator 102. This pressure sensor 123 outputs the high pressure fuel signal to the ECU 53 (its signal line is omitted in FIG. 1).

There also may be provided a water temperature sensor 124 (see the lower right-hand view) which outputs a cooling water temperature signal to the ECU 53.

Further, an intake air temperature sensor 125 (see the upper view) is provided and this sensor 125 outputs an intake air temperature signal to the ECU 53.

Although these are all sensors shown in FIG. 1, it is, of course, practicable to provide other sensors such as an engine height sensor, a trim angle sensor, a knock sensor, a neutral sensor, a watercraft pitch sensor and an atmospheric temperature sensor in accordance with various control strategies.

The ECU 53, as has been noted, outputs signals to the fuel injectors 56, spark plugs 55, the lubrication pumps 52 and the high pressure electric fuel pump 67 for their respective control. These control signals are indicated schematically in FIG. 1. As noted previously, those skilled in the art may select a suitable control strategy for practicing the invention, which relates to the placement and spray pattern of the injectors 56.

Figure 2:
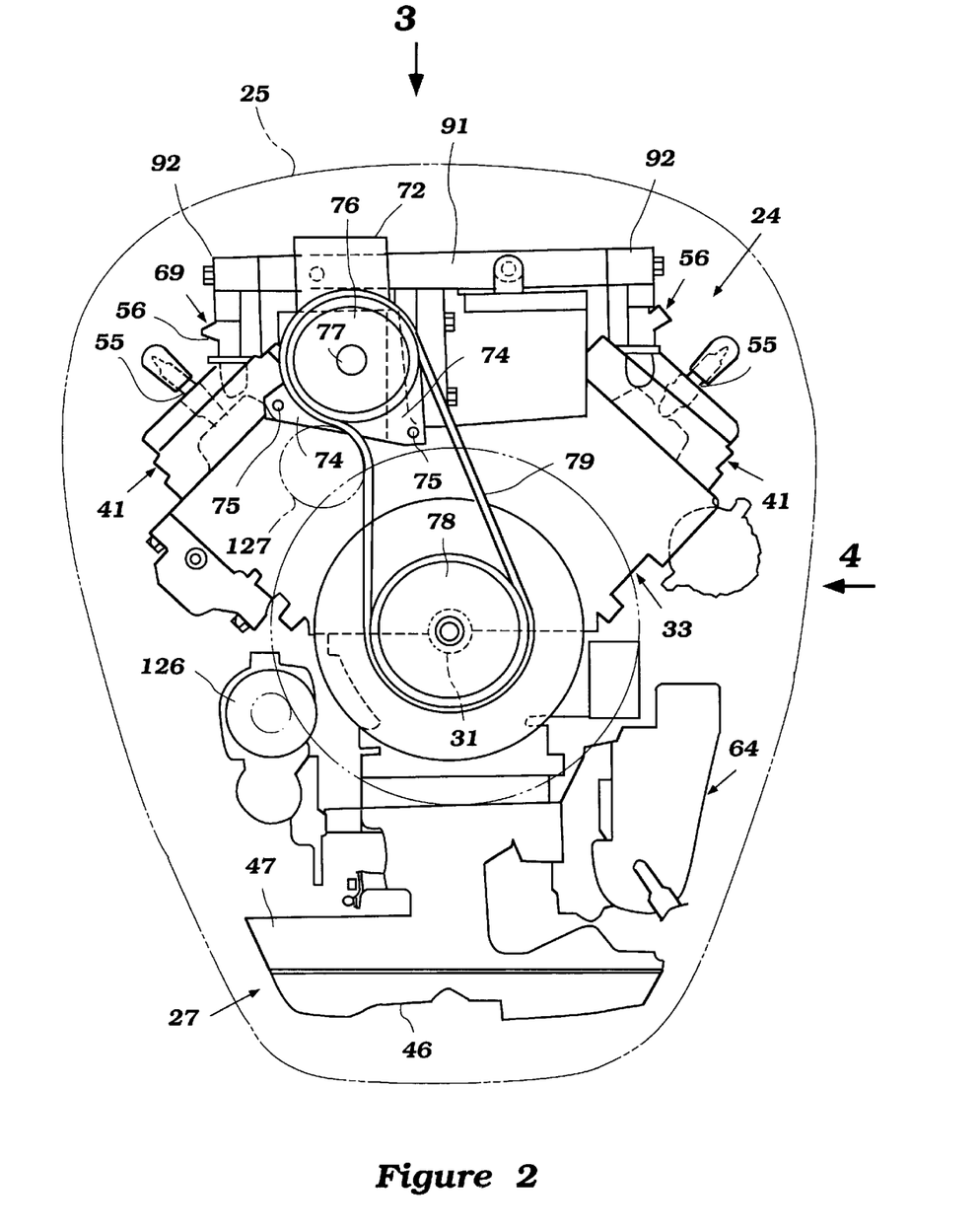
FIG. 2 is a top plan view of the power head showing the engine in solid lines and the protective cowling in phantom.
Figure 3:
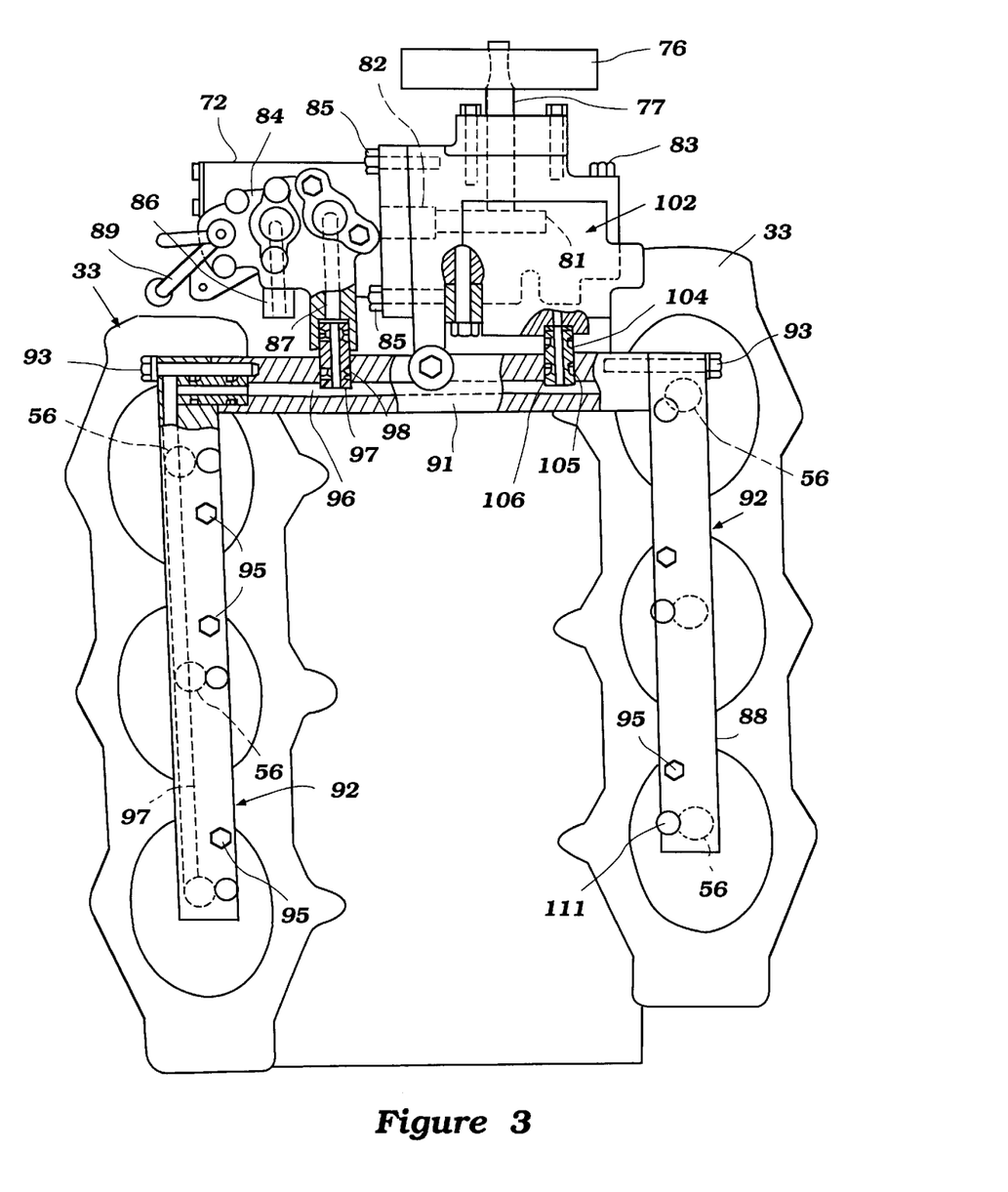
FIG. 3 is a rear elevational view of the engine showing partly in cross-section and is taken generally in the direction of 3 in FIG. 2
Figure 4:
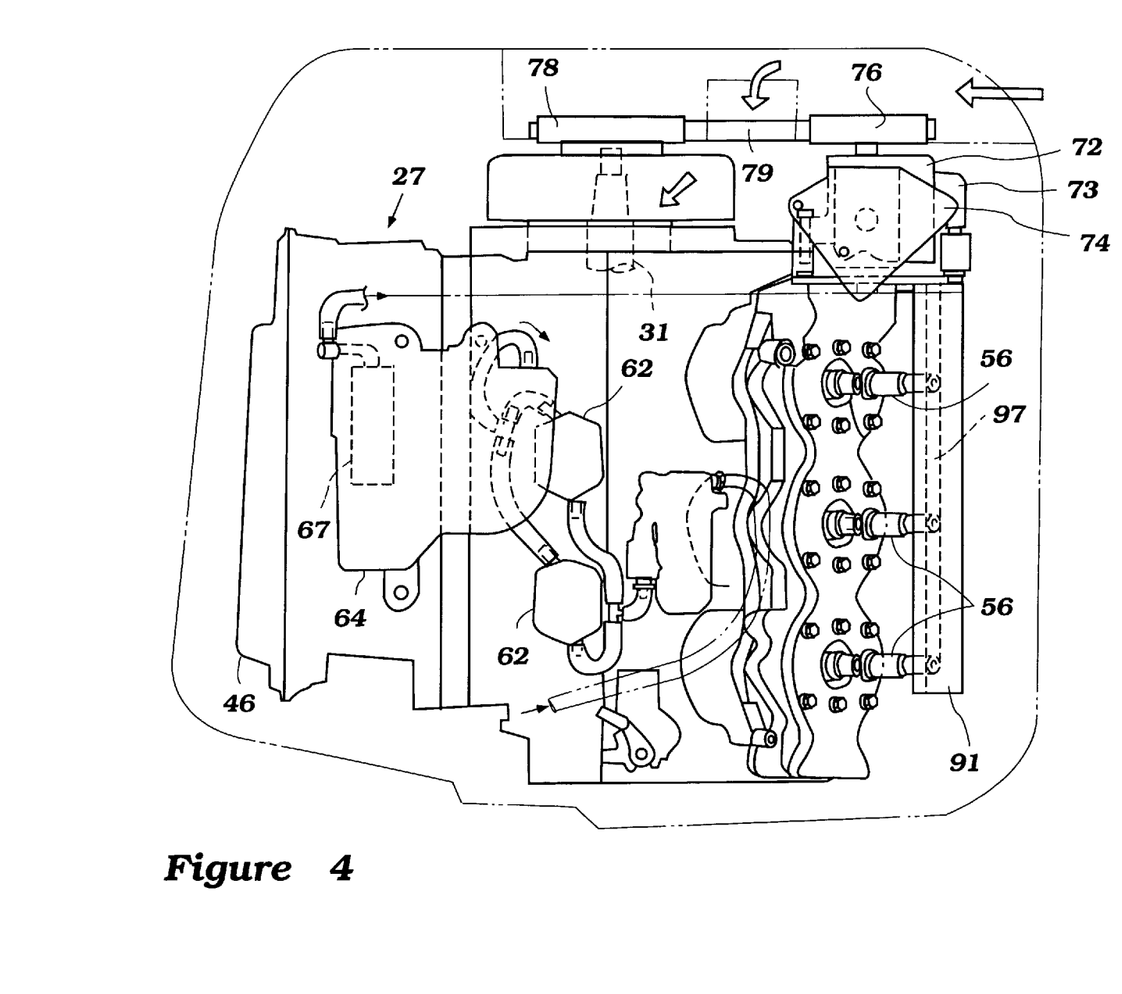
FIG. 4 is a side elevational view of the power head showing the engine in solid lines and the protective cowling in phantom, and is taken in the direction of the arrow 4 in FIG. 2.

In addition, a starter motor 126 for starting the engine 24 and a tensioner 127 for giving tension to the belt 79 are provided (see FIG. 2).

The orientation of the fuel injectors 56 and specifically their spray nozzle portions 108 relative to the other components of the combustion chamber 43 and the scavenge port 54 and exhaust port 114 will now be described by primary reference to FIGS. 9–11.

Figure 9:
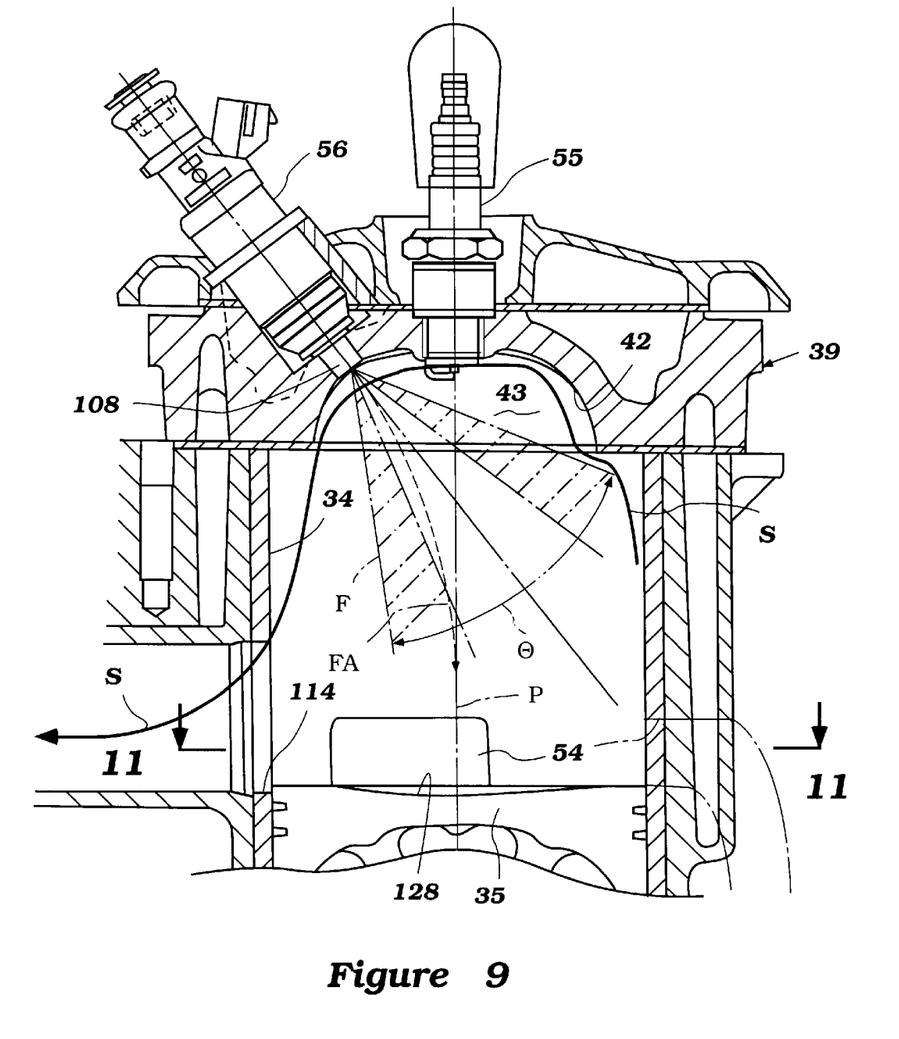
FIG. 9 is a cross-sectional view taken through the engine along a plane the same as the plane of FIG. 7 but looking in the opposite direction and showing the scavenge flow pattern as well as the fuel injection spray and how it is affected by the scavenge flow.
Figure 10:
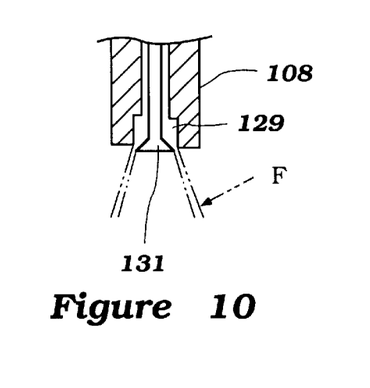
FIG. 10 is an enlarged cross-sectional view taken through the tip of the fuel injector of this embodiment.
Figure 11:
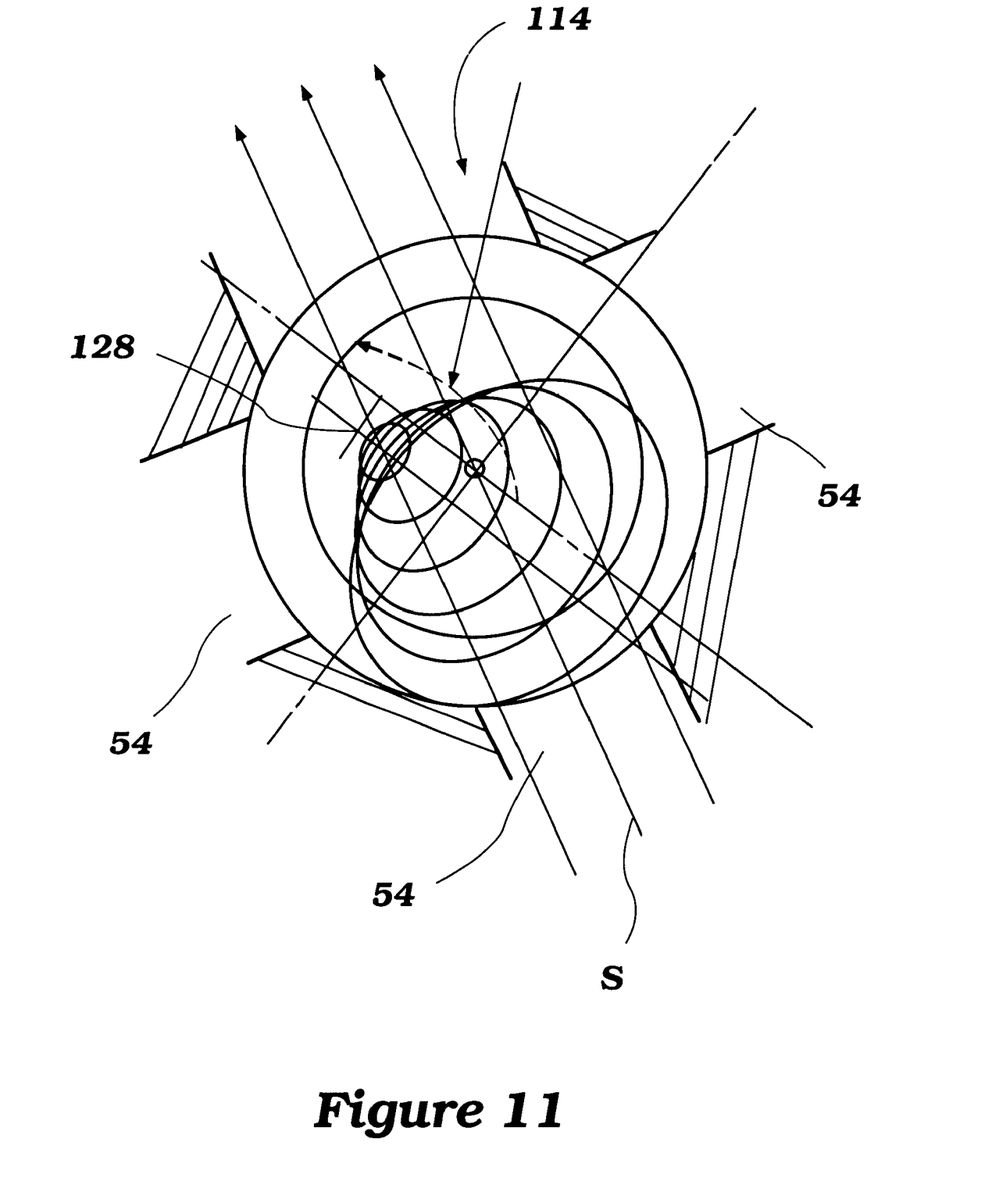
FIG. 11 is a perspective view looking in the direction of the line 11—11 in FIG. 9 showing in somewhat three dimensional form the spray pattern from the fuel injector and its relationship to the ports of the engine.

First, considering FIGS. 9 and 11, it will be seen that there are provided in this preferred embodiment three scavenge ports 54 which are arranged in a configuration so as to provide a Schnurl scavenging effect in the cylinder bores 34 to create a flow pattern as generally shown by the arrows S in FIGS. 9 and 11. This causes the gases to flow upwardly toward the combustion chamber recess 43 formed in the cylinder head assembly 39 and then be deflected downwardly to move toward the exhaust port 114.

In accordance with the invention, the fuel injector 108 is mounted in the cylinder head assembly 39 generally on the exhaust side thereof but offset slightly to one side of the exhaust port 114 as best seen in FIG. 11 wherein its spray axis is indicated by the line 128.

It should be noted that the cylinder head recess 42 is configured as a hemispherical shape and has a diameter that is substantially smaller than the diameter of the cylinder bore 34. Thus, the scavenge air flow is slightly deflected as it enters into the cylinder head recesses 42 as shown in FIG. 9.

The spray pattern and positioning of the fuel injector nozzle portion 108 and its spray cone, indicated by the dimension F is chosen so as to ensure that fuel will not impinge upon the cylinder head surface 42 even though the injector nozzle 108 is recessed into it and sprays at an angle thereto. The desire is to have the scavenge flow travel in such a fashion as to sweep the injected charge away from the cylinder head recess surface 42 and also generally away from the cylinder bore surface 34 above the auxiliary (center) scavenge port and downwardly toward the head of the piston 35. To achieve this effect, the spray cone angle θ is chosen so as to be something in the range of 70° or less and in the specific illustrated embodiment, this is actually 60°.

In order to provide cooling for the piston and to assist in fuel vaporization, the heads of the pistons 35 are provided with a small hemispherical recess 128 which has a diameter that is larger than the diameter of the cylinder bore. Thus, there is a vector FA exerted on the spray pattern that causes it to flow along the cylinder bore axis P which is coincidence with the center of the piston recess 28 so as to have the fuel directed in this area so as to cool the piston.

In addition, the fuel that impinges upon the piston head will evaporate during its cooling operation and thus further improve the fuel vaporization in the combustion chamber. However, the spray pattern is generally away from the exhaust port 114 so that fuel will not be swept through the exhaust port for a discharge to the atmosphere before having a chance to burn.

The spray from the nozzle tip 118 is also configured so as to be slightly offset so as to generate a swirl to the spray. As seen in FIG. 10, the fuel injector tip 108 is provided with a port 129 in which the injector valve 131 reciprocates so as to effect the spray pattern F. This opening 129 is slightly eccentric relative to the actual geometric axis of the injector 56 so as to be disposed more toward the scavenge port side than the exhaust side.

Figure 12:
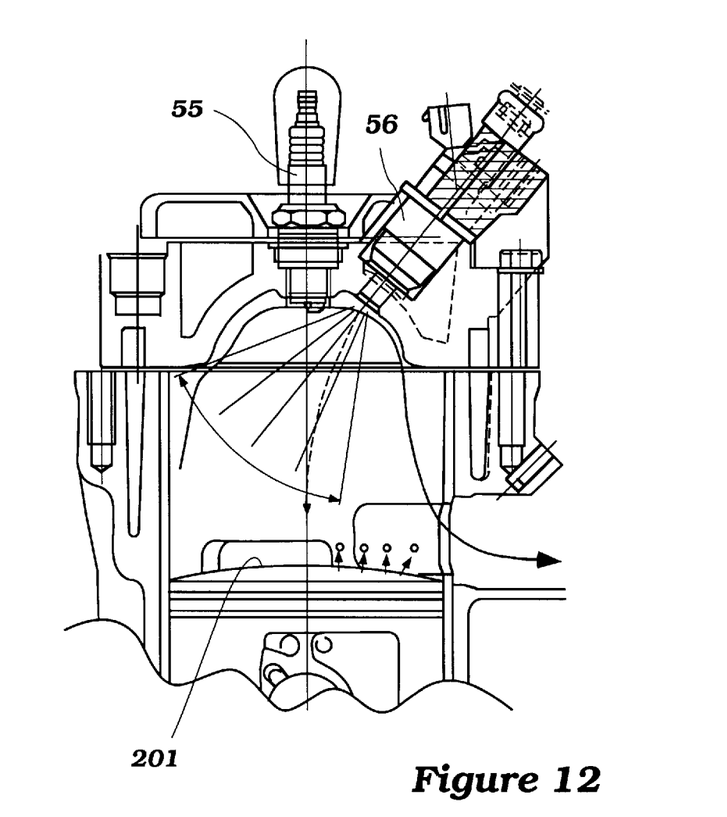
FIG. 12 is a cross-sectional view, in part similar to FIG. 9, and shows another embodiment of the invention.
Figure 13:
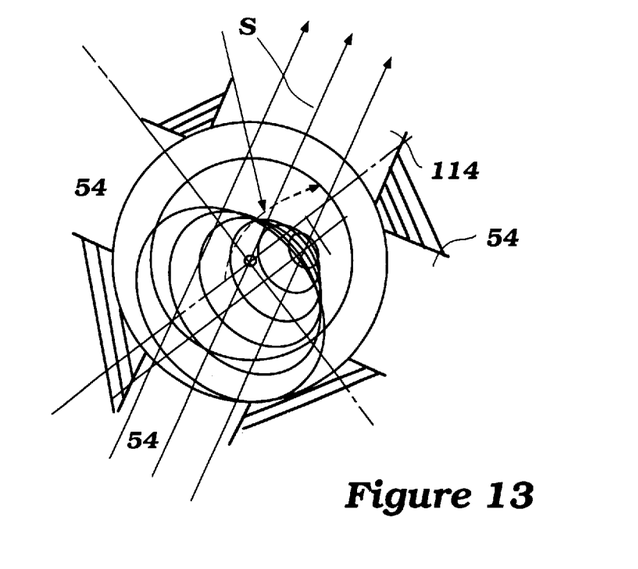
FIG. 13 is a view in part similar to FIG. 11 but shows the three dimensional relationship of the fuel injection spray for this embodiment.

Although the embodiment is thus far described provides a recess in the head of the piston, it is also possible to provide a convex surface and FIGS. 12 and 13 show another embodiment having the same general configuration. However, in this case, the head of the piston is provided with a hemispherical dome 201 on which the fuel particles can impinge and to provide a greater surface area. Thus, fuel vaporization is further promoted and the aforenoted cooling effects are also generated.

It should be also noted that the features of this invention described above can be embodied in engines that operate on a four stroke principle. Also, these features are applicable not only to the outboard motors but also to other various engines such as marine engines except for the outboard motors, lawn mower engines and stationary engines.

Of course, the foregoing description is that of preferred embodiments of the invention, and various changes and modifications may be made without departing from the spirit and scope of the invention, as defined by the appended claims.

What is claimed is:

1. A two cycle internal combustion engine operating on a crankcase compression principal, said engine having a combustion chamber defined by a cylinder bore of a cylinder block, a piston reciprocating in said cylinder bore and a cylinder head closing said cylinder bore and having a recessed area cooperating with said piston and said cylinder bore to form the combustion chamber of the engine, at least one scavenge port opening into one side of said cylinder bore and opened and closed by the reciprocation of said piston therein, at least one exhaust port formed in said cylinder bore and opened and closed by the reciprocation of said piston, said at least one scavenge port and said at least one exhaust port being disposed in diametrically opposed relationship, and a fuel injector is mounted in said cylinder head and having an injection tip extending into said cylinder head recess for spraying fuel into said combustion chamber, said fuel injector being positioned generally on the side of said combustion chamber where said exhaust port is located and spraying generally downwardly and toward said at least one scavenge port, said fuel injector having a spray pattern that is configured so that it will not impinge upon said cylinder head recessed surface area.

2. A two cycle internal combustion engine as set forth in claim 1 wherein the cylinder head recess is hemispherical.

3. A two cycle internal combustion engine as set forth in claim 2 wherein the diameter of the cylinder head recess is substantially less than the diameter of the cylinder bore.

4. A two cycle internal combustion engine as set forth in claim 3 wherein the head of the piston is formed with a hemispherical portion.

5. A two cycle internal combustion engine as set forth in claim 4 wherein the diameter of the piston hemispherical portion is substantially greater than that of the cylinder head recess.

6. A two cycle internal combustion engine as set forth in claim 4 wherein the diameter of the piston hemispherical portion is substantially greater than that of the cylinder bore.

7. A two cycle internal combustion engine as set forth in claim 4 wherein the hemispherical portion of head of the piston is concave.

8. A two cycle internal combustion engine as set forth in claim 7 wherein the diameter of the piston hemispherical portion is substantially greater than that of the cylinder head recess.

9. A two cycle internal combustion engine as set forth in claim 7 wherein the diameter of the piston hemispherical portion is substantially greater than that of the cylinder bore.

10. A two cycle internal combustion engine as set forth in claim 4 wherein the hemispherical portion of head of the piston is convex.

11. A two cycle internal combustion engine as set forth in claim 10 wherein the diameter of the piston hemispherical portion is substantially greater than that of the cylinder head recess.

12. A two cycle internal combustion engine as set forth in claim 10 wherein the diameter of the piston hemispherical portion is substantially greater than that of the cylinder bore.

13. A two cycle internal combustion engine as set forth in claim 1 wherein the at least one scavenge port comprises an auxiliary scavenge port disposed circumferentially between a pair of main scavenge ports that lie on circumferentially opposite sides of the at least one exhaust port.

14. A two cycle internal combustion engine as set forth in claim 13 wherein the spray axis of the fuel injector is offset from a scavenge flow axis defined by the scavenge ports.

15. A two cycle internal combustion engine as set forth in claim 1 wherein the spray from the fuel injector is generally conical and is such that a portion of the fuel spray will impinge on the head of the piston.

16. A two cycle internal combustion engine as set forth in claim 15 wherein the head of the piston is formed with a hemispherical portion.

17. A two cycle internal combustion engine as set forth in claim 16 wherein the hemispherical portion of head of the piston is convex.

18. A two cycle internal combustion engine as set forth in claim 16 wherein the hemispherical portion of head of the piston is concave.

19. A two cycle internal combustion engine as set forth in claim 1 further including a spark plug mounted in the cylinder head recess.

20. A two cycle internal combustion engine as set forth in claim 19 wherein the spark plug is positioned between the at least one scavenge port and the fuel injector.

21. A two cycle internal combustion engine as set forth in claim 20 wherein the spray from the fuel injector is directed away from the spark plug.

* * * * *